(12) United States Patent
Baekelandt et al.

(10) Patent No.: US 7,989,528 B2
(45) Date of Patent: Aug. 2, 2011

(54) COUPLING AGENT TO PROVIDE THE COUPLING OF A METAL ELEMENT TO A MATERIAL TO BE REINFORCED

(75) Inventors: Tom Baekelandt, Dadizele (BE); Albert Somers, Gentbrugge (BE); Nadine Van De Velde, Harelbeke (BE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 12/522,035

(22) PCT Filed: Feb. 21, 2008

(86) PCT No.: PCT/EP2008/052151
§ 371 (c)(1),
(2), (4) Date: Jul. 2, 2009

(87) PCT Pub. No.: WO2008/101999
PCT Pub. Date: Aug. 28, 2008

(65) Prior Publication Data
US 2010/0048793 A1 Feb. 25, 2010

(30) Foreign Application Priority Data
Feb. 23, 2007 (EP) .................................. 07102954

(51) Int. Cl.
*C08K 5/24* (2006.01)
*C08K 3/08* (2006.01)
(52) U.S. Cl. ....................................... 524/261; 524/439
(58) Field of Classification Search ................... 524/261
See application file for complete search history.

(56) References Cited

U.S. PATENT DOCUMENTS

| | | | |
|---|---|---|---|
| 4,146,585 A * | 3/1979 | Ward et al. ................. | 525/102 |
| 5,047,287 A | 9/1991 | Horiuchi et al. | |
| 6,355,127 B1 | 3/2002 | Mahdi et al. | |
| 7,005,476 B1 | 2/2006 | Terfloth et al. | |
| 7,138,537 B2 * | 11/2006 | Cruse et al. ................. | 556/457 |
| 2005/0032974 A1 | 2/2005 | Krebs et al. | |

FOREIGN PATENT DOCUMENTS

| | | |
|---|---|---|
| EP | 0 488 949 B1 | 6/1992 |
| EP | 1 464 878 B1 | 10/2004 |
| JP | 2005-015644 A | 1/2005 |
| WO | WO 03/054049 A1 | 7/2003 |

* cited by examiner

*Primary Examiner* — Ling-Siu Choi
*Assistant Examiner* — Hui Chin
(74) *Attorney, Agent, or Firm* — Foley & Lardner LLP

(57) ABSTRACT

The invention relates to a coupling agent to provide the coupling of a metal element to a vulcanizable elastomeric material whereby the coupling agent provides both binding to the metal element and reaction with the vulcanizable elastomeric material. The coupling agent comprises a macromolecular backbone and at least one functional endgroup. The functional endgroup is responsible for the binding to the metal element. The backbone has a molecular weight ranging between 1000 and 10000 and has at least one unsaturated carbon-carbon bond for reacting with the vulcanizable elastomeric material. The invention further relates to an article comprising a metal element at least partially embedded in a vulcanizable elastomeric material and comprising a coupling agent to provide the coupling of the metal element to the vulcanizable elastomeric material.

29 Claims, 1 Drawing Sheet

COUPLING AGENT TO PROVIDE THE COUPLING OF A METAL ELEMENT TO A MATERIAL TO BE REINFORCED

FIELD OF THE INVENTION

The invention relates to a coupling agent to provide the coupling of a metal element to a material to be reinforced, more preferably a vulcanizable elastomeric material.

The invention further relates to an article comprising a metal element at least partially embedded in a material to be reinforced comprising a coupling agent to provide the coupling of the metal element to a vulcanizable elastomeric material.

Furthermore, the invention relates to a method to provide the coupling of a metal element to a vulcanizable elastomeric material.

BACKGROUND OF THE INVENTION

Polymeric material reinforced with metal elements such as steel wires or steel cords are widely applied in a variety of products such as conveyor belts, hoses and tires.

One of the critical problems to be solved is to achieve good adhesion between the metal element and the polymeric material.

Especially, for specialty rubbers such as chloroprene rubber, ethylene propylene diene monomer (EPDM) rubber, nitrile rubber as for example butadiene acrylonitrile (NBR) or hydrogenated butadiene acrylonitrile (HNBR), the adhesion between the metal element and the rubber remains critical.

The use of bifunctional silanes is known in the art to promote the adhesion of a metal element to a material to be reinforced. However, for many applications these bifunctional silanes do not provide an adequate adhesion between the metal element and the material to be reinforced.

Other coatings such as phenol-formaldehyde resins, halogenated polymers and olefin based polymer systems have been developed to promote the adhesion between a metal element and specialty rubbers.

A drawback of these coatings is that relative thick layers (usually between 25 and 50 μm) are necessary. Another drawback is that toxic solvents like xylene or perchloroethylene are used to apply these coatings on the metal elements.

Furthermore for many applications these coatings do not allow to reach the required adhesion level.

SUMMARY OF THE INVENTION

It is an object of the present invention to avoid the drawbacks of the prior art.

It is another object of the present invention to provide a coupling agent to provide the coupling of a metal element to a vulcanizable elastomeric material whereby said coupling agent provides both binding to the metal element and reaction with the vulcanizable elastomeric material during vulcanization.

It is a further object of the invention to provide an article comprising a metal element at least partially embedded in a vulcanizable elastomeric material and comprising a coupling agent to provide the coupling of the metal element to the vulcanizable elastomeric material.

It is still a further object to provide a method to provide the coupling of a metal element to a vulcanizable elastomeric material.

According to a first aspect of the present invention a coupling agent to provide the coupling of a metal element to a vulcanizable elastomeric material is provided.

The coupling agent provides both binding to the metal element and reaction with the vulcanizable elastomeric material.

The coupling agent comprises a macromolecular backbone and at least one endgroup.

The at least one endgroup provides the binding to the metal element whereas the backbone provides the reaction with the vulcanizable elastomeric material.

The backbone of the coupling agent and the vulcanizable elastomeric material react preferably during vulcanization.

The endgroup comprises a —$SiX_3$ group, whereby —X represents a functional group. Each functional group —X is selected independently from the group consisting of —R, —OR, —OC(=O)R and the halogens such as —Cl, —Br, —F, whereby —R is an alkyl, preferably a C1-C4 alkyl, most preferably —$CH_3$ and —$C_2H_5$.

Possibly, the coupling agent comprises more than one endgroup. In a preferred embodiment, the coupling agent comprises two endgroups. The two endgroups can be the same or can be different.

The backbone comprises a macromolecular structure having a molecular weight ranging between 1000 and 10000, More preferably, the molecular weight ranges between 2000 and 5000 as for example between 3000 and 4000. The backbone has at least one unsaturated carbon-carbon bond for reacting with the vulcanizable elastomeric material. The reaction between the coupling agent and the vulcanizable elastomeric material occurs preferably during the vulcanization of the vulcanizable elastomeric material.

Preferably, the polarity of the backbone is chosen to match the polarity of the vulcanizable elastomeric material.

The polarity of the vulcanizable elastomeric material can be influenced by introducing one or more polar functional groups in the backbone. Possible polar functional groups are —COOH, —OH, —$NH_2$, —COOR, —SH, —OR, —CN, —CONHR, —NHR and —$NR_2$; whereby R is an alkylgroup for example a C1-C4 alkyl.

A preferred way to influence the polarity of the backbone is by choosing the percentage of acrylonitrile of the backbone.

The percentage of acrylonitrile of the backbone ranges preferably between 0% and 40%, as for example 0%, 10%, 18%, 21% or 26%.

The coupling agent according to the present invention is the reaction product of at least one organofunctional silane and at least one multifunctional polymer.

Important for the present invention is that the coupling agent is applied on the metal element in one step. This means that first a mixture of at least one organofunctonal silane and at least one multifunctional polymer is prepared. After the reaction of the organofunctional silane and the multifunctional polymer, the mixture is applied on the metal element.

The organofunctional silane and the multifunctional polymer are described in more detail below.

Organofunctional Silane

The organofunctional silane comprises at least one first functional group and at least one second functional group. The first functional group is capable of binding to the metal element and the second functional group comprises at least one group capable of binding to at least one functional group of the multifunctional polymer.

Preferred organofunctional silanes are silanes of the following formula

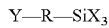

whereby

SiX$_3$ comprises a first functional group;

R comprises a spacer;

Y comprises a second functional group.

The first functional group SiX$_3$ is capable of binding to the metal element.

X represents a functional group, each of the functional groups being independently selected from the group consisting of —R, —OR, —OC(═O)R and the halogens such as —Cl, —Br, —F, whereby —R is an alkyl, preferably a C1-C4 alkyl, most preferably —CH$_3$ and —C$_2$H$_5$.

The second functional group is capable of binding to at least one functional group of the multifunctional polymer.

The second functional group comprises at least one group selected from the group consisting of isocyanate groups, thiocyanate groups and epoxy groups.

An organofunctional silane with an isocyanate group as second functional group is preferred.

Examples of suitable organofunctional silanes comprising an isocyanate group are isocyanatoalkylalkoxy silanes such as isocyanatopropyltriethoxy silane, isocyanatopropyltrimethoxy silane, isocyanatobutyltrimethoxy silane and isocyanatobutyltriethoxy silane.

Multifunctional Polymer

The multifunctional polymer comprises at least one first functional group being capable of binding with the second functional group of the organofunctional silane, i.e. with the isocyanate group.

The multifunctional polymer has a molecular weight ranging between 1000 and 10000 and has at least one unsaturated carbon-carbon bond.

As multifunctional polymer any polymer or prepolymer having at least one first functional group for binding with the second functional group of the organofunctional silane can be considered.

Preferred first functional groups of the multifunctional polymer comprise amino functional groups, thiol functional groups or hydroxyl functional groups.

According to a preferred embodiment of the present invention, the multifunctional polymer comprises at least one amino functional group. The amino functional group may comprise an aliphatic amine or an aromatic amine and may comprise either a primary or secondary amine. Aliphatic amines and secondary amines are preferred.

Next to the first functional group the multifunctional polymer comprises further functional groups (for example second, third, fourth, . . . functional groups). These further functional groups are capable of reacting with vulcanizable elastomeric material during vulcanization. Adhesion between the metal and the material to be reinforced is provided through the formation of chemical bonds between the multifunctional polymer and the material to be reinforced.

Preferably, the multifunctional polymer comprises at least one unsaturated carbon-carbon bond as further functional group. More preferably, the multifunctional polymer comprises a number of unsaturated carbon-carbon bonds.

These unsaturated carbon-carbon bonds are capable of reacting with the material to be reinforced. Preferably, the unsaturated carbon-carbon bond of the multifunctional polymer is participating in the vulcanization.

The functional groups of the multifunctional polymer can be chosen in function of the desired polarity of the multifunctional polymer. The polarity of the multifunctional polymer can for example be influenced by choosing the functional groups of the multifunctional polymer. Possible functional groups are —COOH, —OH, —NH$_2$, —COOR, —SH, —OR, —CN, —CONHR, —NHR and —NR$_2$; whereby R is an alkylgroup for example a C1-C4 alkyl.

A preferred way to influence the polarity of the multifunctional polymer is by choosing the percentage of acrylonitrile of the multifunctional polymer.

The percentage of acrylonitrile of the multifunctional polymer ranges preferably between 0% and 26%, as for example 0%, 10%, 18%, 21% or 26%.

Preferred examples of multifunctional group comprise butadiene acrylonitrile copolymers and butadiene homopolymers with amino functional groups.

The multifunctional polymer has a molecular weight that is preferably ranging between 1000 and 10000, and more preferably between 2000 and 5000 as for example 3000 or 4000.

It can be preferred to add a cross-linker to the mixture of the organofunctional silane and the multifunctional polymer. By adding such a cross-linker the organofunctional silane is forming a denser cross-linked network on the metal surface.

This denser cross-linked network increases the adhesion level of the metal element to the vulcanizable elastomeric material as the number of bonds to promote the adhesion and the metal element is increased.

In principle any cross-linker that is helping to form a dense cross-linked network on the metal surface can be considered.

Preferred cross-linkers are compounds that allow to form a dense cross-linked polysiloxane network on the metal surface such as low molecular organofunctional silanes. A further example of a suitable cross-linker comprises bis(tri ethoxy silyl)ethane.

The concentration of the cross-linker is dependant on the specific metal element-material to be reinforced.

Metal Element

The metal element may be made of any metal or metal alloy. Preferably, the metals or metal alloys are selected from iron, copper, titanium, aluminum or alloys thereof. Preferred metal elements comprise steel elements. The steel preferably comprises plain carbon steels, micro-alloyed steels or stainless steels.

The metal element preferably comprises an elongated element. Preferred metal elements comprise monofilaments or multifilaments. The monofilaments can have any cross-section, such as a circular cross-section, a rectangular cross-section or an elliptical cross-section. Examples of monofilaments comprise wires, fibers, strips and ribbons. As multifilaments bundled, twisted, braided or woven structures can be considered. Examples of multifilaments comprise cords, ropes, strands and cables.

The metal elements can be coated with a metal or metal alloy coating. Preferred metal or metal alloy coatings comprise zinc, tin, copper or alloys thereof. Preferred metal alloys comprise zinc alloys such as zinc copper, zinc aluminium, zinc cobalt, zinc nickel or zinc iron.

Vulcanizable Elastomeric Material

Any vulcanizable elastomeric material that can be reinforced with metal elements can be considered.

Examples comprise rubbers such as natural rubber, isoprene rubber, chloroprene rubber, ethylene propylene diene monomer (EPDM) rubber, nitrile rubber as for example butadiene acrylonitrile (NBR) or hydrogenated butadiene acrylonitrile (HNBR).

The material to be reinforced may further comprise additives such as reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the art.

According to a second aspect an article comprising at least one metal element that is at least partially embedded in a vulcanizable elastomeric material is provided.

The article further comprises a coupling agent to provide the coupling between the metal element and the vulcanizable elastomeric material. The coupling agent provides both binding to the metal element and interaction with the vulcanizable elastomeric material.

The coupling agent is described above in more detail.

The article can for example be used as hoses, cables, belts such as conveyor belts, timing belts or V-belts, reinforced elastomer strips, tires, airsprings, . . . .

According to a third aspect of the present invention, a method to provide the coupling of a metal element to a vulcanizable elastomeric material is provided.

The method comprises the steps of
providing at least one metal element;
applying a coupling agent as described above on said metal element;
embedding said metal element provided with said coupling agent at least partially in a vulcanizable elastomeric material;
vulcanizing said vulcanizable elastomeric material.

The coupling agent is providing the coupling of the metal element to the vulcanizable elastomeric material by providing both binding to the metal element and reaction with the vulcanizable elastomeric material.

It can be preferred to subject the metal element to a pretreatment such as a cleaning treatment before the application of the coupling agent.

As cleaning treatment any cleaning treatment known in the art can be considered. Examples comprise thermal treatments, mechanical treatments, chemical treatments or combinations thereof.

The coupling agent is obtained by
preparing a mixture comprising at least one organofunctional silane and at least one multifunctional polymer, said organofunctional silane comprising at least one first functional group and at least one second functional group; said first functional group of said organofunctional silane being capable of binding to said metal element; said second functional group of said organofunctional silane comprising at least one group selected of the group consisting of isocyanate groups, thiocyanate groups and epoxy groups; said multifunctional polymer comprising at least one first functional group; said first functional group of said multifunctional polymer being capable of binding to said second functional group of said organofunctional silane; whereby said second functional group of said organofunctional silane is binding with said first functional group of said multifunctional polymer in said mixture.

Preferably, a solvent is added to the mixture.

According to a fourth aspect of the present invention, a method to influence the adhesion strength between a metal element and a vulcanizable elastomeric material by using a coupling agent to provide the coupling of a metal element to a vulcanizable elastomeric material is provided.

The method comprises the step of choosing the polarity of the multifunctional polymer so that the polarity of the multifunctional polymer approximates the polarity of the material to be reinforced. By tailoring the polarity of the multifunctional polymer to the polarity of the material to be reinforced, the multifunctional polymer will be more compatible with the material to be reinforced and will be able to reorient and align itself into the material to be reinforced, which is the optimal condition for chemical bonding of the multifunctional polymer with the material to be reinforced.

The difference in polarity of two materials as for example the multifunctional polymer and the material to be reinforced can be evaluated by measuring the difference in contact angle of a particular solvent as for example water on the two materials.

The polarity of the multifunctional polymer can for example be influenced by choosing the functional groups of the multifunctional polymer. Possible functional groups are —COOH, —OH, —NH$_2$, —COOR, —SH, —OR, —CN, —CONHR, —NHR and —NR$_2$; whereby R is an alkylgroup for example a C$_1$-C$_4$ alkyl.

A preferred way to influence the polarity of the multifunctional polymer is by choosing the percentage of acrylonitrile of the multifunctional polymer.

The percentage of acrylonitrile of the multifunctional polymer ranges preferably between 0% and 26%, as for example 0%, 10%, 18%, 21% or 26%.

For apolar rubbers like EPDM rubber or natural rubber multifunctional polymers comprising no acrylonitrile or a low percentage of acrylonitrile are preferred.

For polar rubbers, like chloroprene rubber multifunctional polymers comprising a high percentage of acrylonitrile as for example 20% or 26% are preferred.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
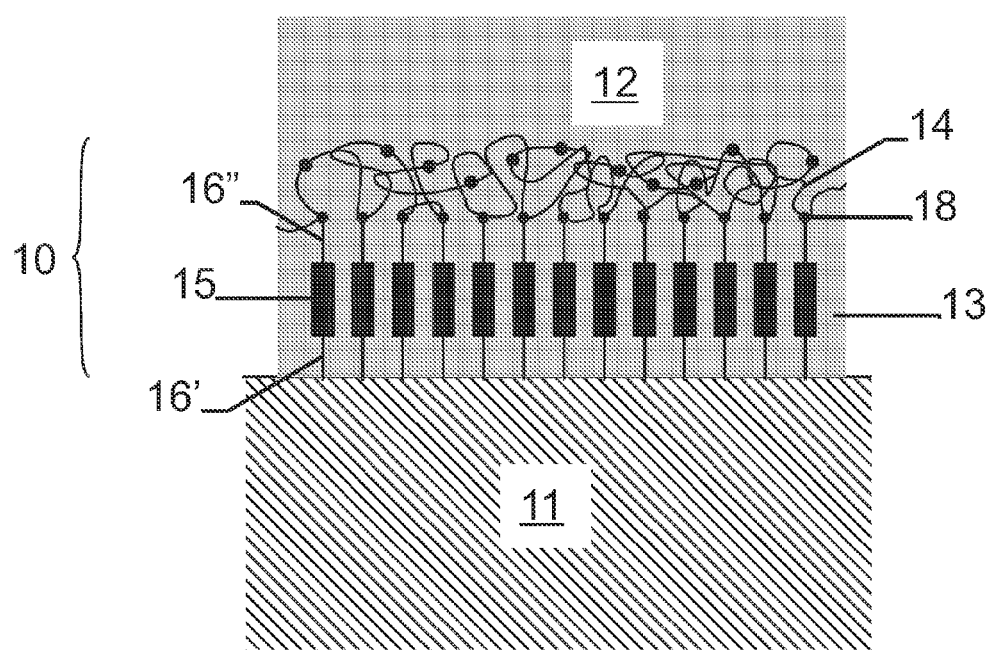
FIG. 1 is a schematic view of a system to promote the adhesion between a metal element and a material to be reinforced according to the present invention.

FIG. 1 shows an example of an article comprising a coupling agent 10 according to the present invention. The coupling agent 10 provides the coupling of a metal element 11 to vulcanizable elastomeric material 12.

The coupling agent 10 comprises a macromolecular backbone and at least one end group.

The coupling agent 10 is the reaction product of an organofunctional silane 13 and a multifunctional polymer 14.

The molecules of the organofunctional silane 13 are depicted as small blocks 15 having a first functional group 16' and a second functional group 16". The first functional group 16' is bonding to the metal surface 11. The second functional group 16" is directed outward and comprises at least one isocyanate group.

The multifunctional polymer 14 is compatible with and copolymerizable, covulcanizable or cross-linkable with the material to be reinforced 12.

The multifunctional polymer 14 has at least one first functional group 18 comprising an amino group. The first functional group 18 of multifunctional polymer 14 is bound to the second functional group 16" of the organofunctional silane.

The adhesion of different coupling agents according to the present invention is illustrated in some examples.

Adhesion between the metal element and the polymer material is determined by determining the pull out force and the APR value (appearance value).

The pull out force is determined as described below.

A metal element is embedded in a vulcanizable elastomeric material.

The length of the metal element embedded in the vulcanizable elastomeric material is 12.7 mm. The vulcanizable elastomeric material comprising the metal element is vulcanized. The metal elements are pulled out from the vulcanized rubber. The forces necessary to pull out the metal elements are measured. By comparing the forces needed to pull out the "adherence loss rating" is determined.

The pull out tests have been carried out according to ASTM D229-(93) "Standard test method for adhesion between steel tire cores and rubber" and according to BISFA (The International Bureau for the standardization of man-made fibres) No. E12 "Determination of static adhesion to rubber compound").

The APR values (appearance rating) are determined by means of a visual assessment of the amount of vulcanized material that remains on the metal element (degree of coverage) after the peeling off of the metal element from the vulcanized material.

A first example comprises zinc coated steel cords of the type 3+5×7×0.15 mm embedded in sulfur cured chloroprene rubber. The adhesion results are given in Table 1.

Example 1A relates to zinc coated steel cords of the type 3+5×7×0.15 mm embedded in sulfur cured chloroprene rubber without using a coupling agent.

Example 1B relates to zinc coated steel cords of the type 3+5×7×0.15 mm, treated with a coupling agent and embedded in sulfur cured chloroprene rubber. The coupling agent is the reaction product of isocyanatopropyltriethoxy silane and a 18% acrylonitrile 1,4 butadiene copolymer with aminofunctional endgroups.

Example 1 C relates to zinc coated cords of the type 3+5×7×0.15 mm, treated with the coupling agent as in example 1B and embedded in sulfur cured chloroprene rubber. Before the coupling agent is applied the zinc coated cords are pretreated by dipping the cords in a suitable acid solution.

TABLE 1

|    | POF (N) | APR (%) |
|----|---------|---------|
| 1A | 40 N    | 0%      |
| 1B | 301 N   | 5%      |
| 1C | 342 N   | 13%     |

A second example comprises brass coated steel cords of the type 3+5×7×0.15 mm embedded in sulfur cured natural rubber The adhesion results are given in Table 2.

Example 2A relates to brass coated steel cords of the type 3+5×7×0.15 mm embedded in sulfur cured natural rubber without using a coupling agent.

Example 2B relates to brass coated steel cords of the type 3+5×7×0.15 mm, treated with a coupling agent and embedded in sulfur cured natural rubber. The coupling agent is the reaction product of isocyanatopropyltriethoxy silane and a 10% acrylonitrile 1,4 butadiene copolymer with aminofunctional endgroups.

Example 2C relates to brass coated cords of the type 3+5×7×0.15 mm, treated with the coupling agent as in example 2B and embedded in sulfur cured natural rubber. Before the coupling agent is applied the brass coated cords are pretreated by dipping the cords in a suitable acid solution.

TABLE 2

|    | POF (N) | APR (%) |
|----|---------|---------|
| 2A | 443 N   | 65%     |
| 2B | 614 N   | 80%     |
| 2C | 698 N   | 87%     |

A third example comprises AISI 302 stainless steel cords of the type 4×3×0.15 mm embedded in sulfur cured chloroprene rubber. The adhesion results are given in Table 3.

Example 3A relates to AISI 302 stainless steel cords of the type 4×3×0.15 mm embedded in sulfur cured chloroprene rubber without using a coupling agent.

Example 3B relates to AISI 302 stainless steel cords of the type 4×3×0.15 mm treated with a coupling agent and embedded in sulfur cured chloroprene rubber. The coupling agent is the reaction product of isocyanatopropyltriethoxy silane and a 18% acrylonitrile 1,4 butadiene copolymer with aminofunctional endgroups.

Example 3C relates to AISI 302 stainless steel cords of the type 4×3×0.15 mm with the coupling agent as in example 3B and embedded in sulfur cured chloroprene rubber. Before the coupling agent is applied the zinc coated cords are pretreated by dipping the cords in a suitable acid solution.

TABLE 3

|    | POF (N) | APR (%) |
|----|---------|---------|
| 3A | 12 N    | 0%      |
| 3B | 163 N   | 7%      |
| 3C | 200 N   | 78%     |

A fourth example comprise brass coated wire having a diameter of 0.3 mm embedded in sulfur cured butadiene acrylonitrile (NBR) rubber.

The adhesion results are given in Table 4.

Example 4A relates to brass coated wires having a diameter of 0.3 mm embedded in sulfur cured NBR rubber without using a coupling agent.

Example 4B relates to brass coated wires having a diameter of 0.3 mm treated with a coupling agent and embedded in sulfur cured NBR rubber. The coupling agent is the reaction product of isocyanatopropyltriethoxy silane and a 18% acrylonitrile 1,4 butadiene copolymer with aminofunctional endgroups.

Example 4C relates to brass coated wires having a diameter of 0.3 mm treated with the coupling agent as in example 4B and embedded in sulfur cured NBR rubber. Before the coupling agent is applied the zinc coated cords are pretreated by dipping the cords in a suitable acid solution.

TABLE 4

|    | POF (N) | APR (%) |
|----|---------|---------|
| 4A | 66 N    | 16%     |
| 4B | 101 N   | 29%     |
| 4C | 137 N   | 41%     |

A fifth example comprises zinc coated wire having a diameter of 0.37 mm embedded in peroxide cured chlorinated polyethylene (CPE) rubber.

The adhesion results are given in Table 5.

Example 5A relates to zinc coated wires having a diameter of 0.37 mm embedded in peroxide cured CPE rubber without using a coupling agent.

Example 5B relates to zinc coated wires having a diameter of 0.37 mm treated with a coupling agent and embedded in peroxide cured CPE rubber. The coupling agent is the reaction product of isocyanatopropyltriethoxy silane and a 18% acrylonitrile 1,4 butadiene copolymer with aminofunctional endgroups.

Before the coupling agent is applied the zinc coated cords are pretreated by dipping the cords in a suitable acid solution.

TABLE 5

| | POF (N) | APR (%) |
|---|---|---|
| 5A | 6 N | 0% |
| 5B | 132 N | 40% |

A sixth example comprises brass coated steel cord of the type 7×0.35 mm embedded in sulfur cured EPDM rubber.

Example 6A relates to brass coated steel cords of the type 7×0.35 mm embedded in sulfur cured EPDM rubber without using a coupling agent.

Example 6B relates to brass coated steel cords of the type 7×0.35 mm treated with a coupling agent and embedded in sulfur cured EPDM.

The coupling agent is the reaction product of isocyanatopropyltriethoxy silane and a 18% acrylonitrile 1,4 butadiene copolymer with aminofunctional endgroups. Before the coupling agent is applied the zinc coated cords are pretreated by dipping the cords in a suitable acid solution.

TABLE 6

| | POF (N) | APR (%) |
|---|---|---|
| 6A | 35 N | 0% |
| 6B | 263 N | 15% |

Preferably, multifunctional polymers having a high polarity are used for vulcanizable elastomeric materials having a high polarity such as chloroprene rubber.

Multifunctional polymers having a low polarity are preferably used for vulcanizable elastomeric materials having a low polarity.

The invention claimed is:

1. A coupling agent to provide the coupling of a metal element to a vulcanizable elastomeric material whereby said coupling agent provides both binding to the metal element and reaction with said vulcanizable elastomeric material, said coupling agent comprising a macromolecular backbone and at least one end group, said end group comprising a —SiX₃ group for binding to the metal element, whereby X represents a functional group, each functional group X being independently selected from the group consisting of —R, —OR, —OC(=O)R and the halogens such as —Cl, —Br, —F, whereby —R is an alkyl group, said backbone having a molecular weight ranging between 1000 and 10000 and having at least one unsaturated carbon-carbon bond for reacting with said vulcanizable elastomeric material.

2. A coupling agent according to claim 1, whereby said backbone of said coupling agent comprises at least one polar functional group.

3. A coupling agent according to claim 2, whereby said polar functional group is selected from the group consisting of —COOH, —OH, —NH₂, —COOR, —SH, —OR, —CN, —CONHR, —NHR and —NR₂; whereby R is an alkylgroup for example a C1-C4 alkyl.

4. A coupling agent according to claim 1, whereby said backbone of said coupling agent comprises between 0% and 40% acrylonitrile.

5. A coupling agent according to claim 1, whereby said coupling agent is a reaction product of at least one organofunctional silane and at least one multifunctional polymer; said organofuntional silane comprising at least one first functional group and at least one second functional group, said first functional group being capable of binding to said metal element and said second functional group comprising at least one group selected from the group consisting of isocyanate groups, thiocyanate groups and epoxy groups;

said multifunctional polymer comprising at least one first functional group, said first functional group of the multifunctional polymer being capable of binding with said isocyanate group of said organofunctional silane.

6. A coupling agent according to claim 5, whereby said first functional group of said multifunctional polymer comprises at least one functional group selected from the group consisting of amino functional groups, thiol functional groups and hydroxyl functional groups.

7. A coupling agent according to claim 5, whereby said organofunctional silane is an isocyanatoalkylalkoxy silane.

8. A coupling agent according to claim 5, whereby said multifunctional polymer has a molecular weight ranging between 1000 and 10000.

9. A coupling agent according to claim 5, whereby said multifunctional polymer has at least one unsaturated carbon-carbon bond for reacting with material to be reinforced.

10. A coupling agent according to claim 1, whereby said metal element is made of a metal or metal alloy selected from the group consisting of iron, copper, titanium, aluminum and alloys thereof.

11. A coupling agent according to claim 1, whereby said metal element comprises a monofilament or a multifilament.

12. A coupling agent according to claim 1, whereby said metal element is coated with a metal or metal alloy coating, said metal or metal alloy coating being selected from the group consisting of zinc, tin, copper and alloys thereof.

13. An article comprising at least one metal element, said metal element being at least partially embedded in vulcanizable elastomeric material, said article further comprising a coupling agent as defined in claim 1 to provide the coupling between said metal element and said vulcanizable elastomeric material.

14. An article according to claim 13, whereby said article comprises a hose, a cable, a belt, a reinforced elastomer strip, a tire or an air spring.

15. A method to provide the coupling of a metal element to a vulcanizable elastomeric material, said method comprising the steps of providing at least one metal element;

applying a coupling agent as defined in claim 1 on said metal element;

embedding said metal element provided with said coupling agent at least partially in a vulcanizable elastomeric material;

vulcanizing said vulcanizable elastomeric material.

16. A method according to claim 15 whereby said coupling agent is a reaction product of at least one organofunctional silane and at least one multifunctional polymer, said organofunctional silane comprising at least one first functional group and at least one second functional group; said first functional group of said organofunctional silane being capable of binding to said metal element; said second functional group of said organofucntional silane comprising at least one group selected from the group consisting of isocyanate groups, thiocyanate groups and epoxy groups; said multifunctional polymer comprising at least one first functional group; said first functional group of said multifunctional polymer being capable of binding to said second functional group of said organofuncitional silane; whereby said second functional group of said organofunctional silane is capable of binding with said first functional group of said multifunctional polymer in said agent.

17. A method according to claim 16, whereby said first functional group of said multifunctional polymer comprises at least one functional group selected from the group consisting of amino functional groups, thiol functional groups and hydroxyl functional groups.

18. A method according to claim 16, whereby said organofunctional silane is an isocyanatoalkylalkoxy silane.

19. A method according to claim 16, whereby said multifunctional polymer has a molecular weight ranging between 1000 and 10000.

20. A method according to claim 16, whereby said multifunctional polymer has at least one unsaturated carbon-carbon bond for reacting with said material to be reinforced.

21. A method according to claim 15, whereby said metal element is made of a metal or metal alloy selected from the group consisting of iron, copper, titanium, aluminum and alloys thereof.

22. A method according to claim 15, whereby said metal element comprises a monofilament or a multifilament.

23. A method according to claim 15, whereby said metal element is coated with a metal or metal alloy coating, said metal or metal alloy coating being selected from the group consisting of zinc, tin, copper and alloys thereof.

24. A method to influence the adhesion strength between a metal element and a vulcanizable elastomeric material by using a coupling agent as defined in claim 1 to provide the coupling of the metal element to the vulcanizable elastomeric material, said method comprising the step of choosing the polarity of the backbone of said coupling agent so that the polarity of the backbone approximates the polarity of the vulcanizable elastomeric material.

25. A method according to claim 24 whereby said polarity of said backbone is chosen by choosing a percentage of acrylonitrile of the backbone.

26. A method according to claim 25, whereby the percentage of acrylonitrile of said backbone ranges between 0 and 26%.

27. A coupling agent according to claim 1, whereby said backbone of said coupling agent comprises between 10% and 40% acrylonitrile.

28. A coupling agent to provide the coupling of a metal element to a vulcanizable elastomeric material wherein said coupling agent provides both binding to the metal element and reaction with said vulcanizable elastomeric material, said coupling agent comprising:

a macromolecular backbone and at least one endgroup, said endgroup comprising a —SiX$_3$ group for binding to the metal element, wherein X represents a functional group, functional group X being selected from the group consisting of —R, —OR, —OC(=O)R and the halogens, wherein —R is an alkyl, said backbone having a molecular weight ranging between 1000 and 10000 and having at least one unsaturated carbon-carbon bond for reacting with said vulcanizable elastomeric material.

29. A coupling agent according to claim 1, whereby the alkyl is a C1-C4 alkyl group.

* * * * *